UNITED STATES PATENT OFFICE.

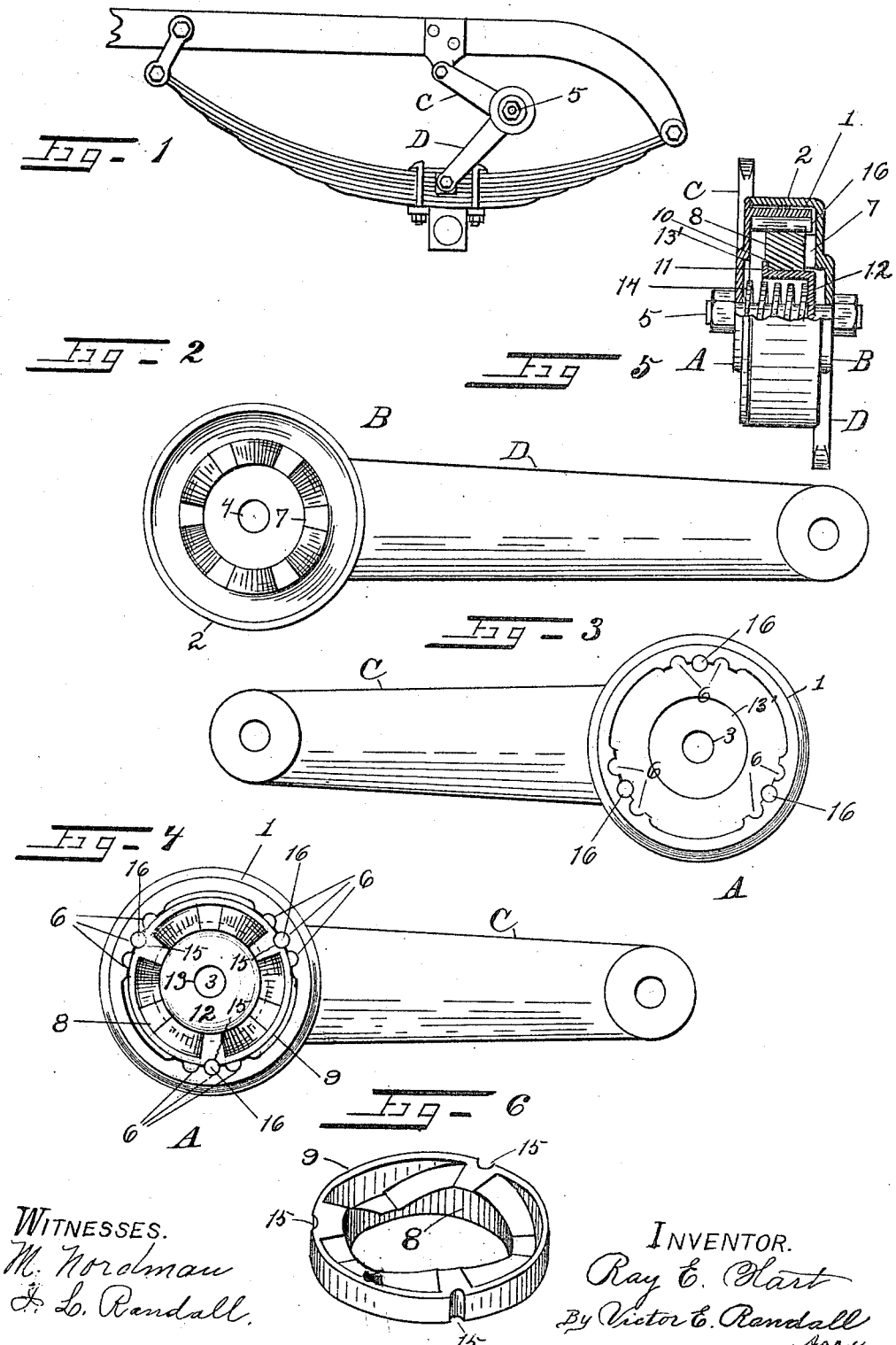

RAY E. HART, OF BATTLE CREEK, MICHIGAN.

SHOCK-ABSORBER FOR VEHICLES.

1,041,276.   Specification of Letters Patent.   Patented Oct. 15, 1912.

Application filed November 15, 1911. Serial No. 660.386

*To all whom it may concern:*

Be it known that I, RAY E. HART, a citizen of the United States, residing at Battle Creek, in the county of Calhoun and State of Michigan, have invented certain new and useful Improvements in Shock-Absorbers for Vehicles, of which the following is a specification.

The present invention more particularly relates to means for gradually reducing the resiliency of vehicle springs and to overcome their liability to fracture, either when distended or compressed.

It contemplates the attachment of a pivotally suspended double lever, one arm of which is attached to the vehicle body proper and the other to the axle or spring opposite to the body, and means arranged at the axle or pivot of the levers whereby, by the spreading or collapsing of said levers beyond a predetermined limit, said means will afford a cushion coöperative with the vehicle spring, and lessen the shock imparted to said spring occasioned from any means, either at recoil or rebound.

It also has for its object, to provide an article for the purpose, whereby the same can be readily adjusted to attach to vehicles of varying heights between axle and body, and also to increase or diminish the resiliency of the parts.

It also contemplates means whereby the pivotal levers will oscillate on a common pivot in true arcs; whereby the same will be symmetrical in design, economical to manufacture, and positive in operation.

These and other objects will hereinafter appear in the following specification, and be particularly set forth in the appended claims.

In the drawings forming a part of this specification, Figure 1, is a side view of my improved shock absorber as applied to a vehicle. Fig. 2, is a detail view of one of the oscillating levers with a cam race formed therewith. Fig. 3, is a detail view of the opposite lever. Fig. 4, is a detail plan view of the lever shown in Fig. 3 with the portable cam race and spring receiving thimble inserted in operative position. Fig. 5, is a semi-cross section of the assembled device, and Fig. 6, is a perspective view of the portable friction cam.

Like marks of reference refer to corresponding parts throughout the different views, in which—

A, and B, are the main component frame sections of the device, the section A, having a flange or rim extension I, adapted to telescope within the rim 2, of the part B, both sections being axially apertured as at 3, and 4, respectively, and when in operative contact prevented from displacement by means of a bolt 5. The sections have arms C, and D, respectively, the arms at their outer free extremities being pivotally attached to the running gear of a vehicle in the ordinary manner for attaching friction devices for a like purpose. At intervals of space within the rim of the section A, semicircular longitudinally arranged slots, or grooves 6, are formed. These grooves by preference are equally spaced trios, arranged in units of equal triangular spaced distances.

The section B, has a triangularly arranged cam-faced race 7, concentric within the rim 2, and so spaced that the rim 1, of the section A, may play freely thereinbetween when in operative position, as shown in Fig. 5.

Within and between the sections A, and B, and seated upon the cam race 7, a portable ring-shaped cam 8, is placed. This cam has a face corresponding in shape to the cam race 7, and by preference has a peripheral rim 9, the depth of the cam's working pitch. When the faces of the respective cams are nested, the rim of the cam 8, telescopes over the outside of the cam 7, between the respective cam and the rim 1. The back of the cam 8, is flat, and it has a groove 10, (Fig. 5,) intersecting it center opening, within which the rim 11, of a spring receiving thimble 12, is seated. The thimble has a central aperture 13, at its indrawn end through which the clamping bolt 5, is passed when in working position. The thimble is fitted through the cam 8, with the rim 11, seated within the groove 10, thereof, and opens toward the section A; said section having an offset, or countersunk portion 13', to receive the outer end of the rim 11, when the cams are fully extended. Within the thimble and bearing against the section A, a coil spring 14, is fitted; the bolt 5, passing successively through the section A, spring 14, thimble 12, and the section B, as shown.

At triangular arranged points within the rim of the cam 8, semi-circular grooves 15, corresponding in size to the grooves in the rim 1, are placed. These grooves by preference are arranged at the radial centers of the cam elevations, the latter of which by preference are flattened and present the same annular plane. Within a corresponding groove triangularly arranged within the rim 1, cylindrical steel studs 16, are fitted, and within this rim, flat surface downward, the cam 8, is placed. In fitting the cam within the rim 1, grooves 15, stride the studs 16, loosely, and permit said cam to easily work up and down within the rim when in operative position. The object of the studs is manifold; they permit the cam to freely work, or telescope within the rim 1, and at the same time retain a grip rotatable therewith, in the operation of the lever D. The studs further perform the service of regulating the attachment of the operative parts to a vehicle, as by shifting them within the grooves 6, of the rim 1, the arms C, and D, are closed together or thrown apart as the occasion may require; for instance, assuming that the cams 7, and 8, when the arms are arranged as shown in Fig. 1, were required to be either spread farther apart, or closed nearer together, in making the attachment to a vehicle; by arranging the studs 16, either to the right or to the left of a center position collectively, as the occasion might require, and carrying the cam 8 so that the grooves 15, thereof would interlock with said studs, the interlocking of the parts would cause the same to move on the same pivotal center. By the peculiar arrangement of the parts, the broadened surfaces of the cam faces when fully out of inter-locking contact ride upon their flattened extremities, without exerting additional tension on the spring 14, the spring itself when thus extended affording a maximum of resiliency and relieving the parts of the device from strain or breakage by abrupt engagement, and permitting the springs of a vehicle to gradually cushion in their action.

From the foregoing description, taken in connection with the drawings, it is believed a further explanation of its workings and advantages will not be necessary.

Having therefore, set forth the object and advantages of my invention, what I claim, and desire to secure by Letters Patent, is:—

1. In a shock absorber comprising oppositely disposed hinged sections pivotally attached at their outer extremities to the body and running gear of a vehicle respectively, one of said sections having a fixed cam race, the opposite section having a rim with detachable interiorly arranged studs, a portable cam race within said rim between said sections, said race engaging with said rim studs and prevented from rotary movement therein but telescopically movable therewith, a thimble fitted within said cam race and movable therewith, a spring fitted within said thimble bearing against the indrawn end thereof and at the opposite end against the section having the rim with detachable interiorly-arranged studs, and a bolt axially passing through the assembled parts, as and for the purpose set forth.

2. In a shock absorber, the combination with two supporting members pivotally hinged and telescopically fitted to oscillate in true arcs, a concentrically disposed triangular cam formed within one of said members and a correspondingly shaped portable intermeshing cam fitted within the other member, detachable studs fitted within grooves between the periphery of the portable cam and the inner rim of its incasing member, whereby said cam cannot rotate within said rim but be telescopically movable therein, and whereby the angularity of said pivotal members may be changed on their axes by the shifting of the movable studs, substantially as set forth and for the purpose set forth 3. In a shock absorber, the combination with two supporting members pivotally hinged and telescopically fitted to oscillate in true arcs, a concentrically-disposed triangular cam formed within one of said members and a correspondingly-shaped portable intermeshing cam fitted within the other member, detachable studs fitted within grooves between the periphery of the portable cam and the inner rim of the incasing member, whereby the angularity of the pivotal members may be shifted on their axes and whereby said members may be longitudinally movable but non-rotatable, a thimble fitted within said portable cam, a spring fitted within said thimble bearing against the indrawn end thereof and the member without a fixed cam and a bolt axially passing through the assembled parts, as and for the purpose set forth.

RAY E. HART.

Witnesses:
 WALTER H. NORTH,
 CLARENCE E. MUIRHEAD.